United States Patent [19]

Ruffner

[11] Patent Number: 4,745,154

[45] Date of Patent: May 17, 1988

[54] WATER SOLUBLE POLYMERS, THEIR PREPARATION AND THEIR USES

[75] Inventor: Charles G. Ruffner, Chattanooga, Tenn.

[73] Assignee: Alco Chemical Corporation, Chattanooga, Tenn.

[21] Appl. No.: 851,512

[22] Filed: Apr. 14, 1986

[51] Int. Cl.$^4$ .......................... C08F 2/32; C08F 18/00
[52] U.S. Cl. ...................................... 524/801; 526/320
[58] Field of Search ........................ 524/801; 526/320

[56] References Cited

U.S. PATENT DOCUMENTS

| | | | |
|---|---|---|---|
| Re. 28,474 | 7/1974 | Anderson et al. | 260/29.6 |
| Re. 28,576 | 10/1975 | Anderson et al. | 260/29.6 |
| 2,956,046 | 10/1960 | Glavis et al. | 260/80.5 |
| 3,171,805 | 3/1965 | Suen et al. | 210/54 |
| 3,201,304 | 8/1965 | Munjat | 162/168 |
| 3,259,570 | 7/1966 | Priesing et al. | 210/53 |
| 3,277,157 | 10/1966 | Stewart et al. | 260/486 |
| 3,284,393 | 11/1966 | Vanderhoff et al. | 260/29.6 |
| 3,624,019 | 11/1971 | Anderson et al. | 524/922 |
| 3,657,175 | 4/1972 | Zimmerman et al. | 260/29.6 T |
| 3,707,466 | 12/1972 | Reinwald et al. | 210/52 |
| 3,734,873 | 5/1973 | Anderson et al. | 260/29.6 |
| 3,826,771 | 7/1974 | Anderson et al. | 524/831 |
| 3,896,161 | 7/1975 | Borden et al. | 260/486 R |
| 4,021,399 | 5/1977 | Hunter et al. | 260/29.6 H |
| 4,134,916 | 1/1979 | Moss et al. | 260/561 N |
| 4,135,043 | 1/1979 | Kast et al. | 526/63 |
| 4,138,381 | 2/1979 | Chang et al. | 260/29.6 TA |
| 4,239,671 | 12/1980 | Fink et al. | 260/29.6 TA |
| 4,268,641 | 5/1981 | Koenig et al. | 525/367 |
| 4,338,239 | 7/1982 | Dammann | 524/549 |
| 4,351,754 | 9/1982 | Dupre | 524/445 |
| 4,384,096 | 5/1983 | Sonnabend | 526/313 |
| 4,418,237 | 11/1983 | Imai | 585/443 |
| 4,421,902 | 12/1983 | Chang et al. | 526/317 |
| 4,430,481 | 2/1984 | Hunter | 525/328.4 |
| 4,439,334 | 3/1984 | Borchardt | 252/8.55 D |
| 4,443,576 | 4/1984 | Bhattacharyya | 525/217 |
| 4,462,920 | 7/1984 | Snyder, Jr. et al. | 252/73 |
| 4,482,675 | 11/1984 | Witt | 525/132 |
| 4,493,777 | 1/1985 | Snyder, Jr. et al. | 252/73 |
| 4,503,173 | 3/1985 | Martino et al. | 523/407 |
| 4,507,422 | 3/1985 | Farrar et al. | 524/425 |
| 4,514,552 | 4/1985 | Shay et al. | 526/301 |
| 4,554,298 | 11/1985 | Farrar et al. | 523/336 |
| 4,554,307 | 11/1985 | Farrar et al. | 524/425 |
| 4,579,926 | 4/1986 | Maurer et al. | 526/307.5 |
| 4,600,761 | 7/1986 | Ruffner et al. | 526/301 |
| 4,702,844 | 10/1987 | Flesher et al. | |

FOREIGN PATENT DOCUMENTS

| | | |
|---|---|---|
| 0172723 | 2/1986 | European Pat. Off. |
| 0172724 | 2/1986 | European Pat. Off. |
| WO85/03510 | 8/1985 | PCT Int'l Appl. |
| 2007238 | 5/1979 | United Kingdom |

Primary Examiner—Joseph L. Schofer
Assistant Examiner—N. Sarofim
Attorney, Agent, or Firm—Finnegan, Henderson, Farabow, Garrett & Dunner

[57] ABSTRACT

A copolymer composition prepared in a water-in-oil emulsion by polymerizing a monomer system comprising a surfactant monomer and a water soluble vinyl monomer.

24 Claims, No Drawings

WATER SOLUBLE POLYMERS, THEIR PREPARATION AND THEIR USES

BACKGROUND

This invention relates to water soluble polymers prepared by water-in-oil or inverse emulsion polymerization.

Many synthetic and naturally occuring water soluble polymers have been developed which exhibit useful thickening and flocculating properties. These polymers are used in a variety of applications including coatings, textile printing, waste water treatment, oil drilling mud stabilizers, paints and the like. To be most effective, these polymers must be of very high molecular weight.

Although these polymers are commonly available as powders, they are often utilized as aqueous solutions which require the polymers to be hydrated. This is a time consuming step and will often cause the dispersion of solids in the aqueous media to form a gel, which is difficult to handle. In addition, water solutions containing more than 3% by weight of these polymers exhibit too high a viscosity to handle easily.

A significant advance toward overcoming the difficulties associated with the handling of high molecular weight water soluble polymers was the development of the water-in-oil emulsion described in U.S. Pat. Nos. 3,284,393 and 3,826,771. This process utilizes the technique of preparing a fine dispersion of a water solution of soluble monomers into a nonpolar organic phase and subsequently polymerizing the monomers. This allows the preparation of liquid emulsions of a useful low viscosity containing a large proportion of high molecular weight polymer. As the polymer particles are already hydrated, the polymer disperses quickly into water solution upon inverting the water-in-oil emulsion, thereby eliminating the major problem of gel formation during hydration of dry polymers. The inversion of the water-in-oil emulsion is promoted by the addition of surfactants or solid particles as described in U.S. Pat. No. 3,624,019. These emulsions can be prepared utilizing a variety of water soluble monomers and are described in detail in U.S. Pat. Nos. 4,418,237; 3,259,570; and 3,171,805. All of the above listed patents are incorporated herein by reference.

The molecular weight of the polymers formed in these emulsions may vary over a wide range, i.e., 10,000 to 25,000,000. Preferred polymers have molecular weights greater than 1,000,000.

The organic or nonpolar phase is comprised of inert hydrophobic liquids and makes up between 5 and 50% by weight of the emulsion. Commonly used solvents include kerosene, mineral spirits, mineral oils, xylene, or blends of aliphatic and aromatic hydrocarbons. In some cases halogenated solvents have been used to advantage. Preferred solvents would include Isopar M (Exxon Chemicals), which is an example of a branched chain isoparafinic solvent with low aromatic content.

Many water-in-oil emulsifying agents are known in the art and are described in the Atlas HLB surfactant selector. Effective emulsifying agents will have a HLB of less than 15 and preferably less than 10. Most preferably between 4 and 10. These surfactants are added in amounts ranging between 0.1 and 15% by weight of the emulsion and serve to stabilize the dispersion of the monomer/water solution in the hydrophobic phase.

The resulting emulsion is deoxygenated and polymerization is accomplished with a variety of initiator systems. Typical initiator systems include redox systems such as potassium bromate/t-butyl hydroperoxide; ammonium persulfate/sodium metabisulfite; or thermal systems such as azobisisovaleronitrile.

The thickeners and flocculents formed using this process typically have lower than desirable water viscosities upon dissolution. They also have low stability in the presence of an electrolyte, which results in poor rheological properties.

SUMMARY OF THE INVENTION

The present invention provides a thickener or flocculent with high water viscosities upon dissolution, enhanced electrolyte stability and improved rheological properties through the use of surfactant monomers in water-in-oil emulsions.

The present invention, then, comprises a water soluble copolymer composition obtained by polymerizing in a water-in-oil emulsion a monomer system comprising:

a. an addition copolymerizable surfactant monomer; and b. at least one water soluble vinyl monomer.

The present invention also comprises a water-in-boil emulsion comprising:

a. an oleophilic continuous phase; and b. an aqueous dispersed phase; said dispersed phase containing a water soluble copolymer composition obtained by polymerizing in a water-in-oil emulsion a monomer system comprising:

a. an addition copolymerizable surfactant monomer; and b. at least one water soluble vinyl monomer.

The water soluble copolymer can further comprise a polyethylenically unsaturated crosslinking monomer.

In a preferred embodiment, the water soluble copolymer comprises from 0.1 to about 40 percent, based on the total weight of said copolymer, of an addition copolymerizable water soluble surfactant monomer of the formula:

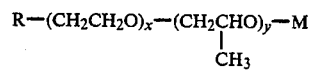

in which M is a monoethylenically unsaturated residue selected from:

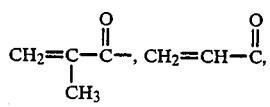

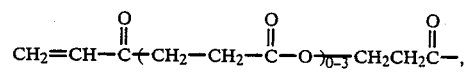

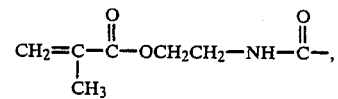

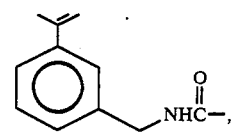

-continued

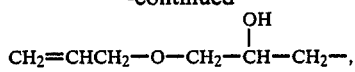

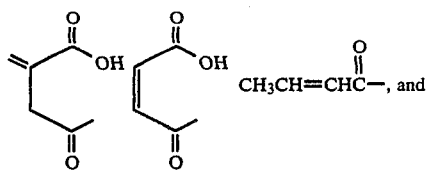

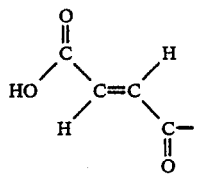

where x is an integer of from 1 to 150 and y is an integer of from 0 to 40 when R is alkoxy, alkylphenoxy, dialkylphenoxy or alkylcarbonyloxy wherein the alkyl groups have from 5 to 30 carbon atoms, or a sorbitan ester of the formula

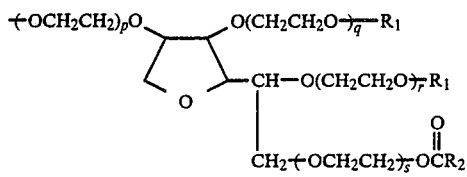

where each of p, q, r and s is an integer and the sum of said integers is from 0 to 40, and $R_1$ is H or —$COR_2$, and $R_2$ is alkyl, alkylphenyl, or dialkylphenyl wherein the alkyl groups have from 5 to 30 carbon atoms; or where x and y are from 0 to 40 when when R is —NH(CH$_2$-)$_3$O—R$_3$, or

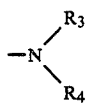

where $R_3$ is H or $R_4$, and $R_4$ is alkyl, alkylphenyl, or dialkylphenyl wherein the alkyl groups have from 5 to 30 carbon atoms.

The water soluble vinyl copolymer, in the preferred embodiment, is selected from at least one of group consisting of:

a. nonionic monomers selected from acrylamide, methacrylamide, acrylonitrile, NN dimethyl acrylamide, methyl acrylate, N-vinyl acetamide, and N-vinyl-N-methyl acetamide;

b. anionic monomers selected from 2-acrylamido-2-methyl propane sulfonic acid, 3-allyloxy-2-hydroxypropane sulfonic acid, styrene sulfonic acid, vinyl sulfonic acid, acrylic, methacrylic, itaconic, fumaric and crotonic acids and salts thereof, and $C_1$-$C_{10}$ monoesters of itaconic, fumaric and maleic acids; and c. cationic monomers selected from dimethyl amino ethyl acrylate, dimethyl amino ethyl methacrylate, dimethyl aminoethyl acrylate methyl chloride, dimethyl aminoethyl acrylate dimethyl sulfate, dimethyl amino ethyl acrylate acetate, dimethyl aminoethyl methacrylate methylchloride, dimethyl amino ethyl methacrylate dimethyl sulfate, dimethyl aminoethyl methacrylate acetate, methacrylamino-propyl trimethyl ammonium chloride and various Mannich type monomer products and the like.

DETAILED DESCRIPTION OF THE INVENTION

The copolymerization reaction is carried out by inverse emulsion or inverse suspension polymerization. The solubility of a particular monomer in water will determine its suitability for use in these systems. The proportions of the monomer can be varied widely within certain specific ranges to obtain thickening agents or flocculents possessing a variety of rheological properties.

Generally, the new copolymers will contain between 0.1 and 40% by weight of an addition copolymerizable surfactant monomer. The presence of the addition copolymerizable surfactant monomer imparts to the copolymer the ability to provide higher water viscosities upon dissolution, as well as enhancing electrolyte stability. This latter property is most important to the stability of the rheological properties of thickened aqueous systems containing salts.

The copolymers will contain between 60 and 99.9% by weight of one or more water soluble vinyl monomers. The choice of the water soluble vinyl monomer determines the copolymer's charge density and the ionic nature as well as comprising the back-bone of the polymer. The vinyl monomers can be either anionic, as in those incorporating acrylic or methacrylic acids; cationic, as in those incorporating dimethyl amino ethyl acrylate or methacrylate; or nonionic, as in those incorporating mainly acrylamide.

The copolymers can optionally contain up to 1 percent of a polyethylenically unsaturated crosslinking monomer such as N,N' methylene bis acrylamide.

MONOMERIC COMPONENTS

A. The addition copolymerizable surfactant monomers

As noted previously, the copolymers of this invention comprise an addition copolymerizable surfactant monomer of the formula:

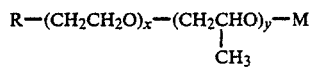

in which M is a monoethylenically unsaturated residue selected from:

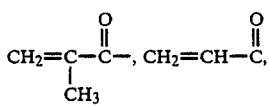

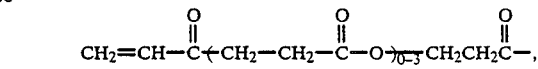

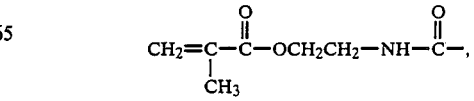

-continued

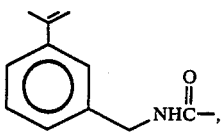

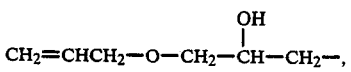

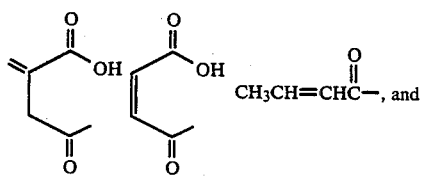

$CH_3CH=CHC(=O)-$, and

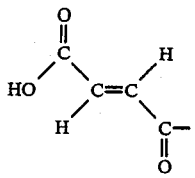

where x is an integer of from 1 to 150 and y is an integer of from 0 to 40 when R is alkoxy, alkylphenoxy, dialkylphenoxy or alkylcarbonyloxy wherein the alkyl groups have from 5 to 30 carbon atoms, or a sorbitan ester of the formula

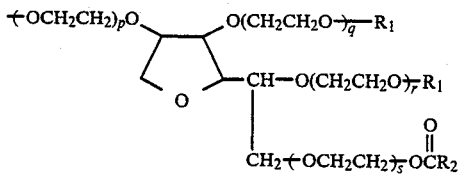

where each of p, q, r and s is an integer and the sum of said integers is from 0 to 40, and $R_1$ is H or $-COR_2$, and $R_2$ is alkyl, alkylphenyl, or dialkylphenyl wherein the alkyl groups have from 5 to 30 carbon atoms; or where x and y are from 0 to 40 when when R is $-NH(CH_2)_3O-R_3$, or

where $R_3$ is H or $R_4$, and $R_4$ is alkyl, alkylphenyl, or dialkylphenyl wherein the alkyl groups have from 5 to 30 carbon atoms.

An essential feature of the chosen surfactant monomer is that it must have adequate water solubility to remain in solution during solution polymerization. Additionally, the chosen surfactant monomer must be polar enough that it is not extracted into the oil phase of the inverse emulsion or inverse suspension polymerization.

The choice of copolymerizable surfactant also has a substantial effect on thickening ability and rheological properties as well as influencing the ease of activation. The most preferable copolymerizable surfactants are those prepared with methylene succinic acid. The neutralizable acid residue renders the surfactant monomer water soluble, thereby ensuring that the monomer is in the water phase and available for copolymerization.

The addition copolymerizable surfactant monomers can be prepared by a variety of methods, including the esterification of acrylic and methacrylic acids (U.S. Pat. No. 4,384,096; 4,421,902), maleic acid half esters (U.S. Pat. No. 3,657,175), urethane monomers (U.S. Pat. No. 4,514,552), or glyceryl-alkyl ether derivatives (U.S. Pat. No. 4,338,239) in the presence of any of a wide variety of nonionic surfactants. All of the above patents are incorporated herein by reference.

The most preferable copolymerization surfactants are prepared by esterifying methylene succinic acid or maleic acid. In this case, the water solubility of the surfactant is less important since the resulting ester monomer is neutralizable and can be rendered water soluble by the addition of an alkaline material. Methylene succinic acid esters are superior to maleic or fumaric acid esters in that they more readily undergo copolymerization with commonly used acrylates.

Examples of nonionic surfactants which can be reacted with methylene succinic acid are the polyoxyethylene alcohols such as poly(oxyethylene)$_{20}$ stearyl ether and poly(oxyethylene)$_4$ lauryl ether; ethoxylated alkylphenols such as poly(oxyethylene)$_{10}$ dinonyl phenol and poly(oxyethylene)$_{40}$ dinonyl phenol; and poly(oxyethylene)$_{20}$ sorbitan monostearate. The reaction is carried out in a toluene solvent and driven to completion via azeotropic distillation of the water byproduct.

Preferred addition copolymerizable water soluble surfactant monomer made from the above process are selected from the group consisting of; heptadecyl poly(oxyethylene)$_{19}$ ethyl methylene succinate, dinonyl phenoxy poly(oxyethylene)$_8$ ethyl methylene succinate, sorbitan monstearate poly(oxyethylene)$_{19}$ ethyl methylene succinate, hexadecyloxy poly(oxyethylene)$_3$ ethyl methylene succinate, dinonylphenoxy poly(oxyethylene)$_{39}$ ethyl methylene succinate, heptadecyl poly(oxyethylene)$_{19}$ maleate, dinonyl phenoxy poly(oxyethylene)$_8$ maleate, sorbitan monstearate poly(oxyethylene)$_{19}$ maleate, hexadecyloxy poly(oxyethylene)$_3$ maleate, and dinonylphenoxy poly(oxyethylene)$_{39}$ maleate.

Generally, the surfactant monomer can comprise 0.1 to 40% by weight of the monomer mixture. Preferably the surfactant monomer comprises 5 to 20 percent by weight of the monomer mixture, 5 to 10 percent being a particularly preferred quantity for such monomer.

B. The copolymerizable water soluble vinyl monomer

Any hydrophilic vinyl monomer can be used in the present invention. The copolymerizable water soluble vinyl monomers generally fall into three categories. The monomers chosen will determine the nature of the charge and the charge density of the copolymer, which affects their subsequent applicability.

The preferred nonionic monomers include acrylamide, methacrylamide, acrylonitrile, NN dimethyl acrylamide, methyl acrylate, N-vinyl acetamide, and N-vinyl-N-methyl acetamide.

The preferred anionic monomers include 2-acrylamido-2-methyl propane sulfonic acid, 3-allyloxy-2-hydroxypropane sulfonic acid, styrene sulfonic acid, vinyl sulfonic acid, acrylic, methacrylic, itaconic, fumaric and crotonic acids and salts thereof, and $C_1-C_{10}$ monoesters of itaconic, fumaric and maleic acids.

The preferred cationic monomers include dimethyl amino ethyl acrylate, dimethyl amino ethyl methacrylate, dimethyl aminoethyl acrylate methyl chloride, dimethyl aminoethyl acrylate dimethyl sulfate, dimethyl aminoethyl acrylate acetate, dimethyl aminoethyl methacrylate methylchloride, dimethyl amino ethyl methacrylate dimethyl sulfate, dimethyl aminoethyl methacrylate acetate, methacrylamino-propyl trimethyl ammonium chloride and various Mannich type monomer products and the like.

The weight percent of the water soluble vinyl monomer is generally between 60 and 99.9 percent. More preferably, between 80 and 95 percent is present. The most preferred weight percentage of the water soluble vinyl monomer is between 90 and 95 percent. Acrylic and methacrylic acids are the preferred anionic monomers. Acrylamide is the preferred nonionic monomer. Dimethyl amino ethyl acrylate is the preferred cationic monomer.

C. The optional polyethylenically unsaturated crosslinking monomer

A small amount of polyethylenically unsaturated monomer may be added as a crosslinking agent. Such monomers include diallyl phthalate, vinyl crotonate, allylmethacrylate, N,N'-methylene-bis-acrylamide, ethylene glycol diacrylate and the like. The preferred crosslinking agent is N,N'-methylene-bis-acrylamide. Preferably from 0 to 1.0% by weight based on monomers is incorporated into the copolymer.

Copolymerization and Properties of the Copolymers

The copolymers of this invention are readily prepared by water-in-oil emulsion polymerization or inverse suspension polymerization. The method chosen will determine the form of the product and its properties.

Water-in-oil emulsions are easily prepared. In general, the solution of monomers is neutralized and added to the organic phase containing a low HLB emulsifier. The resulting mixture is agitated at high shear to form a stable emulsion and rigorously deoxygenated.

The polymerization can be initiated by redox initiators such as potassium bromate/t-butyl hydroperoxide, ammonium persulfate/sodium metabisulfite or by thermal initiators such as azo bisisovaleronitrile. The finished copolymer emulsions have a relatively low viscosity, typically between 50 to 100 cps at 25° C. and generally contain between 20 and 40 percent polymer. The molecular weight of the copolymers will be between 1,000,000 and 25,000,000. Higher solids products can be obtained via distillation (U.S. Pat. No. 4,021,399). By suitable choice of organic phase, the products can also be substantially dewatered via distillation (described in UK No. 2,007,238) yielding a copolymer dispersion in oil. These references are incorporated herein by reference.

The polymerization can be carried out in continuous, semicontinuous or batch fashion. In addition, such polymerizations can be conducted by spraying the catalyzed monomer solution into a heated zone such as a spray dryer or fluidized bed as a polymerization system (U.S. Pat. Nos. 2,956,046 and 4,135,043). The water-in-oil emulsion copolymers of this invention can be added directly to aqueous systems, frequently inverting spontaneously upon addition to release the copolymer from inverse emulsion and substantially thickening or flocculating the system.

As noted previously, the copolymers of this invention can be prepared by inverse emulsion or inverse suspension methods and the resulting copolymer solutions are suitable for use in various industrial applications such as adhesives, drilling fluids, cleaners, walljoint compounds, highly absorbent applications, wallpaper adhesives, textile print pastes, oil recovery applications, flocculants and the like.

The products prepared by inverse emulsion or inverse suspension techniques have the advantage of providing high solids content dispersions of high molecular weight polymers in an easily incorporated liquid form. Solutions of the products are easily prepared as the copolymerized surfactant facilitates the inverting of the water-in-oil emulsion without the addition of inverting surfactant or excessive mixing. The copolymer products of this invention usually can be combined in aqueous compositions designed for particular applications with predictable effects due to the fact that the surfactant monomer may be carefully chosen and incorporated in the copolymer chain in the desired amount.

The following examples, in which all parts are by weight unless otherwise indicated, are presented as a means of further describing the preparation and use of the novel copolymers of this invention, and should not be considered as limiting the scope of the invention.

EXAMPLE 1

Preparation of the surfactant monomer heptadecyl poly(oxyethylene)$_{19}$ ethyl methylene succinate.

A mixture of 198.9 g (0.175 mole) of heptadecyl poly(oxyethylene)$_{20}$ ethanol, 150 g toluene, and 0.5 g of methyl ether of hydroquinone (MEHQ) was charged to a 500 ml reaction flask equipped with a thermometer, mechanical stirrer, heating mantle and Dean and Stark separator. The mixture was heated to reflux to remove any residual water in the surfactant. The mixture was cooled to 70° C. and then 22.8 g of methylene succinic acid (0.175 mole) were added and stirred until dissolved. Then 1.0 g para toluene sulfonic acid (TSA) was added and the mixture was again heated to reflux. After 4 hours, 95% of the theoretical amount of water had been removed. Toluene was removed in vacuo. The product cooled to a white wax that was used without purification.

This reaction is general for ethoxylated fatty alcohols.

EXAMPLE 2

Preparation of dinonyl phenoxy poly(oxyethylene)$_8$ ethyl methylene succinate.

A mixture of 200 g (0.27 mole) of previously dried dinonyl phenoxy poly(oxyethylene)$_8$ ethanol, 0.5 MEHQ, and 150 g toluene were charged to a reactor equipped as in Example 1. The mixture was heated to 60° C. and 35 g of methylene succinic acid were added and allowed to dissolve. Then 1.0 g of TSA was added. The mixture was heated to reflux for 3 hours at which time the reaction was deemed complete based on water removal. The toluene was removed in vacuo and the resulting oil was used without purification. This reaction is general for ethoxylated alkyl and dialkyl phenols.

EXAMPLE 3

Preparation of sorbitan monstearate poly(oxyethylene)$_{19}$ ethyl methylene succinate.

A mixture of 200 g of previously dried poly(oxyethylene)$_{20}$ sorbitan monostearate (0.153 mole), 0.5 g MEHQ and 150 g of toluene were added to a reactor equipped as in Example 1. The mixture was heated to 70° C. when 15.9 g (0.122 mole) of methylene succinic acid and 1.0 g TSA were added. The reaction was completed as described in Example 2. The product was used without further purification after toluene removal. This reaction is general for the class of sorbitan esters.

TABLE I

| CPS* | Surfactant Reactant | Procedure Used Example No. |
|---|---|---|
| 1 | Hexadecyloxy poly(oxyethylene)$_3$ ethanol | 1 |
| 2 | Heptadecyloxy poly(oxyethylene)$_{19}$ ethanol | 1 |
| 3 | Dinonylphenoxy poly(oxyethylene)$_8$ ethanol | 2 |
| 4 | Dinonylphenoxy poly(oxyethylene)$_{39}$ ethanol | 2 |
| 5 | Poly(oxyethylene)$_{20}$ sorbitan monostearate | 3 |

*copolymerizable surfactant

EXAMPLE 4

This example demonstrates the preparation of a representative copolymer by inverse emulsion.

To an all glass reaction vessel equipped with a mechanical stirrer, heating mantle, thermometer, condenser, and nitrogen dispersion tube were added 229.7 g of 66/3 mineral spirits (Union Oil, USA), 207.3 g Isopar M (Exxon Chemicals USA), and 49.9 g of sorbitan mono-oleate. These ingredients were mixed to form an oil phase solution. The monomer phase was prepared by neutralizing a solution of 9.9 grams of a copolymerizable surfactant selected from Table 1, CPS 2, 135.8 g acrylamide, 0.02 g N,N′ methylene-bis-acrylamide, 129.5 g high purity acrylic acid, and 76.3 g of deionized water with approximately 115 g of 28 percent aqueous ammonia. The monomer phase was added with vigorous agitation to the oil phase and mixed at high shear for 15 minutes. The resulting emulsion was purged with N$_2$ for 30 minutes. Upon completion of the purge the batch temperature was raised to 36° C. and the polymerization initiated with minimum t-butyl hydroperoxide/bisulfite redox initiator. The batch temperature was held below 60° C. with cooling. The polymerization was complete in 1.5 hours to yield a low viscosity emulsion containing 27.5 percent solids. A one percent solids water solution yielded a viscosity of 33,500 cps (#6 spindle at 10 RPM Brookfield RVT).

The copolymer emulsion was converted to an essentially water free dispersion by transferring the emulsion into a vessel equipped with a mechanical stirrer, heating mantle, distillation head, thermometer and vacuum pump. The batch was distilled at reduced pressure (26″ vacuum) with heating. The batch temperature rose during distillation from 45° C. to 95° C. when the distillation was deemed complete. The product contained less than 5% water with a total solids content of 45%. A 1 percent solids water solution of the copolymer yielded a viscosity of 33,500 cps (#6 spindle at 10 rpm, Brookfield RVT).

Using the above-described emulsion polymerization procedure, different copolymer dispersions of the invention were prepared. These liquid emulsion copolymers (LEC) are set out in Table 2.

TABLE 2A

| Liquid Emulsion Copolymer According to Ex. 4 | AA | ACM | CPS | MBA | CPS[1] | Neutralization System | Solution Viscosity[2] 1% | Solution Viscosity[2] 1% Cop. + .5% NaCl |
|---|---|---|---|---|---|---|---|---|
| 1 | 25 | 70 | 5 | — | 1 | NaOH | 39,000 | 4,000 |
| 2 | 25 | 70 | 5 | .01 | 1 | NaOH | 44,500 | 1,000 |
| 3 | 95 | — | 5 | — | 2 | NH$_4$OH | 22,000 | 9,000 |
| 4 | 95 | — | 5 | .01 | 2 | NH$_4$OH | 60,000 | 20,000 |
| 5 | 65 | 30 | 5 | — | 2 | NaOH | 60,000 | 1,000 |
| 6 | 65 | 30 | 5 | .01 | 2 | NaOH | 48,000 | 500 |
| 7 | 45 | 50 | 5 | — | 2 | NaOH | 51,000 | 14,500 |
| 8 | 45 | 50 | 5 | .01 | 2 | NaOH | 116,000 | 15,500 |
| 9 | 25 | 70 | 5 | — | 2 | NaOH | 100,000 | 3,000 |
| 10 | 25 | 70 | 5 | .01 | 2 | NaOH | 128,000 | 2,500 |
| 11 | 53 | 32 | 5 | .01 | 2 | NH$_4$OH | 64,000 | 4,000 |
| 12 | 53 | 32 | 5 | .02 | 2 | NH$_4$OH | 33,500 | 1,500 |
| 13 | 65 | 30 | 5 | .01 | 3 | NaOH | 12,000 | 3,000 |
| 14 | 65 | 30 | 5 | .01 | 4 | NaOH | 14,000 | 3,500 |
| 15 | 65 | 30 | 5 | .02 | 4 | NaOH | 43,000 | 1,500 |
| 16 | 25 | 70 | 5 | — | 5 | NaOH | 10,500 | 500 |
| 17 | 25 | 70 | 5 | .02 | 5 | NaOH | 29,500 | 500 |

TABLE 2B

| | AA | ACM | CPS | AMPS | CPS# | Neutralization System | Solution Viscosity[2] 1% Copol. | Solution Viscosity[2] 1% Cop. + .5% Na |
|---|---|---|---|---|---|---|---|---|
| 18 | 60 | 30 | 5 | 5 | 2 | NaOH | 100,000 | 6,500 |
| 19 | 40 | 50 | 5 | 5 | 2 | NaOH | 100,000 | 5,000 |

TABLE 2C

| | ACM | DMAEA[3] | CPS | CPS# | Quaterization System | Solution Viscosity[2] 1% |
|---|---|---|---|---|---|---|
| 20 | 59.75 | 40 | .25 | 2 | Acetic Acid | 1,000 |
| 21 | 55 | 40 | 5 | 2 | Acetic Acid | 5,000 |

[1]Copolymerizable surfactants selected from Table 1.
[2]Brookfield viscosity, #6 spindle at 10 r.p.m. and 25°C.
[3]DMAEA = Dimethyl amino ethyl acrylate
AA = Acrylic acid
ACM = Acrylamide
MBA = N,N′ methylene-bis-acrylamide
AMPS = 2-acrylamido-2-methyl propane sulfonic acid Print pastes The copolymers of the invention are of interest as print paste thickeners for use in, but not limited to, textile printing. For example, an aqueous dispersion having a concentration of 2 percent polymer solids of liquid emulsion copolymers, LEC #12, from Table 2, was studied in a "clear" formulation. The clear formulation was neutralized with ammonium hydroxide to a pH of 9 and treated with up to 10% of an acrylic "low crock" print binder, a representative composition of such type being offered by Alco Chemical Corporation under the designation PB-1, a 45% acrylic emulsion polymer (CAS No. 27082-10-6) and 5% of a color concentrate of the type sold by many companies to textile mills. A typical product of the general type is offered for sale by Catawba Charlabs of North Carolina as Imprement Blue SGG, a blue paste for test purposes.

Viscosity determinations were made on the clear formulations and print paste and the results reflect are set forth below.

lbs/100 ft$^2$, gel strength and at various copolymer concentrations. The results are set forth below:

| | | 7500 mg/l NaCl System | | | | | | | | | | |
|---|---|---|---|---|---|---|---|---|---|---|---|---|
| | | Fann Viscosities | | | | | | | | Gel Strength | | |
| | PPb | 3 | 6 | 100 | 200 | 300 | 600 | PV | YP | AV | 10" | 10' |
| LEC 3 | 0.01 | 12 | 12 | 17 | 20 | 23 | 30 | 7 | 16 | 15 | 17 | 27 |
| | 0.03 | 29 | 29 | 35 | 39 | 43 | 50 | 7 | 36 | 25 | 26 | 28 |
| | 0.05 | 31 | 39 | 47 | 50 | 54 | 62 | 8 | 46 | 31 | 29 | 28 |
| | 0.07 | 26 | 39 | 49 | 52 | 55 | 62 | 7 | 48 | 31 | 24 | 24 |
| LEC 4 | 0.01 | 12 | 12 | 16 | 20 | 22 | 29 | 7 | 15 | 14.5 | 15 | 24 |
| | 0.03 | 16 | 16 | 21 | 25 | 28 | 35 | 7 | 21 | 17.5 | 18 | 23 |
| | 0.05 | 19 | 19 | 25 | 29 | 32 | 39 | 7 | 25 | 19.5 | 22 | 25 |
| | 0.07 | 22 | 22 | 27 | 32 | 35 | 43 | 8 | 27 | 21.5 | 24 | 25 |
| Base + NaCl | | 11 | 11 | 15 | 18 | 20 | 26 | 6 | 14 | 13 | 14 | 25 |
| Control | | 1 | 1 | 3 | 5 | 7 | 12 | 5 | 2 | 6 | 1 | 1 |

| | | 500 mg/l CaCl$_2$ System | | | | | | | | | | |
|---|---|---|---|---|---|---|---|---|---|---|---|---|
| | | Fann Viscosities | | | | | | | | Gel Strength | | |
| | PPb | 3 | 6 | 100 | 200 | 300 | 600 | PV | YP | AV | 10" | 10' |
| LEC 3 | 0.01 | 6 | 6 | 19 | 11 | 13 | 16 | 3 | 10 | 8 | 8 | 9 |
| | 0.03 | 8 | 8 | 12 | 14 | 16 | 19 | 3 | 13 | 9.5 | 9 | 10 |
| | 0.05 | 10 | 10 | 14 | 16 | 18 | 22 | 4 | 14 | 11 | 10 | 10 |
| | 0.07 | 10 | 11 | 15 | 17 | 19 | 23 | 4 | 15 | 11.5 | 10 | 9 |
| LEC 4 | 0.01 | 5 | 5 | 8 | 10 | 12 | 15 | 3 | 9 | 7.5 | 8 | 9 |
| | 0.03 | 6 | 6 | 9 | 11 | 13 | 16 | 3 | 10 | 8.0 | 8 | 12 |
| | 0.05 | 7 | 7 | 10 | 12 | 14 | 18 | 4 | 10 | 9.0 | 9 | 12 |
| | 0.07 | 8 | 8 | 11 | 13 | 15 | 19 | 4 | 11 | 9.5 | 9 | 10 |
| Base + CaCl$_2$ | | 5 | 5 | 8 | 9 | 11 | 14 | 3 | 8 | 7.0 | 7 | 9 |
| Control | | 1 | 1 | 3 | 5 | 7 | 13 | 6 | 1 | 6.5 | 1 | 1 |

| | Brookfield Visc. (cps 25° C.) 10 rpm | |
|---|---|---|
| LEC No. | Clear Dispersion | Print Paste |
| 12 | 75,000 | 25,000 |

Oil well drilling fluids

Typical oil well drilling fluids were prepared using standard methods, and the fluids were subjected to a Fann 35 Viscosimeter test. A comparison was made of the viscosifying effect of various polymers of this invention utilizing a standard bentonite composition (Aquagel® of N. L. Baroid, Inc.) dispersed in mud at 15 pounds per barrel (PPB). The muds were contaminated with either 7500 mg/l sodium chloride or 500 mg/l of calcium chloride and tested for thickening effect. The muds were tested for apparent viscosity at 600 rpm (AV), plastic viscosity in cps (PV), yield point (YP),

Wall joint compound

A wall joint compound was prepared in which was included one of the copolymers of the invention. This compound, designed for use in gypsum board tape joints for building construction, had the formulation set forth below.

| | % Dry Weight |
|---|---|
| Part A | |
| water | 37.80 |
| Disperant | 0.63 |
| LEC 11 | 0.35 |
| Clay | 1.25 |
| Ethylene glycol | 0.63 |
| Defoamer | 0.63 |
| Latex | 5.60 |
| Part B | |
| Titanium Dioxide | 31.10 |
| Mica (325) Mesh) | 11.00 |
| Filler | 11.00 |

The compounds of Part A were blended together to provide a smooth mixture using a low shear folding type mixer. The componments of Part B were dry-blended and added slowly to Part A, and mixing was continued until a smooth blend was obtained. Part of the water of Part A was withheld and added during the addition of Part B.

The resulting wall joint compound of this invention was tested for certain physical properties and the results are tabulated below:

| | Adhesion | Viscosity Helipath TE | Brookfield (rpm) | | | Non Leveling | Slip | Surface Smoothness |
|---|---|---|---|---|---|---|---|---|
| | | | 5 | 10 | 20 | | | |
| LEC 11 | 90% | 580,000 | 96000 | 60000 | 38000 | Good | Good | Good |

|  | Adhesion | Viscosity Helipath TE | Brookfield (rpm) | | | Non Leveling | Slip | Surface Smoothness |
|---|---|---|---|---|---|---|---|---|
|  |  |  | 5 | 10 | 20 |  |  |  |
| w/o LEC | — | 140,000 | — | — | — | Poor | Poor | Poor |

Wallpaper adhesive

The copolymers of this invention may be used, as is, as wallpaper prepaste adhesive. One of the copolymers of the invention was coated onto wallpaper base at a coat weight of 7 grams per square meter. The coated wallpaper was dried at 100° C. for 1 minute. After soaking the prepasted paper in water for 30 seconds, the paste exhibited excellent adhesive properties. The pasted paper was subjected to a heat treatment of 180° C. for one minute with no significant deterioration in paste quality.

|  | Adhesion | Dwell Time | Heat Treatment |
|---|---|---|---|
| LEC 10 | Good | 2 Minutes | Stable |

Polyvinyl alcohol adhesive

The copolymers of the invention can be used to thicken aqueous adhesives. A test formulation was prepared using 15 parts of polyvinyl alcohol (Elvanol 85-80), 35 parts of clay and 150 parts of water. Then ½ part (dry basis) of a copolymer of the invention was added with mixing. No activator was required.

| Adhesive base | 7,000 cps |
|---|---|
| ½ part LEC 7 added | 21,000 cps (#6 spindle 20 rpm Brookfield RVT) |

Aqueous Defoamer

The copolymers of this invention can be used to thicken aqueous defoamers. A representative formulation was prepared by emulsifying 100 grams of oleic acid into 100 grams of water using 10 grams of nonyl phenol 10 mole ethoxylate. This emulsion was thickened to a viscosity of 2000 cps with 5.1 grams (dry basis) of LEC 8. The product was demonstrated to be effective as a defoamer.

Mineral acid based cleaners

An example of an acid based hard surface cleaner was prepared using a copolymer of the invention (LEC 8). Two hundred fifty (250) parts of 85% phosphoric acid, $H_3PO_4$ was thickened with 30 parts LEC 8 to a viscosity of 100,000 cps at 20 rpm.

|  | Viscosity of $H_3PO_4$, cps |
|---|---|
| w/o LEC 8 | 500 |
| 30 grams/250 grams | 1000,000 |

The resulting viscous acid allows a thicker application of cleaner on a surface, thereby increasing the amount of cleaner in contact with the surface and decreasing the time necessary for cleaning.

Alkaline based cleaners

An example of a caustic soda based hard surface cleaner was prepared using a copolymer of the invention (LEC 8).

One hundred fifty-five (155) parts of 46% sodium hydroxide was thickened with 21 parts LEC 8 to a viscosity of 4000 cps at 20 rpm.

| w/o LEC 8 | 100 |
|---|---|
| 21 grams/155 grams | 4,000 |

The resulting viscous alkali allows a thicker application of cleaner on a surface, thereby increasing the amount of cleaner in contact with the surface and decreasing the time necessary for cleaning.

Thickening of latex based coatings and adhesive

An example of a latex based coating was prepared using a commercially available carboxylated styrene-butadiene emulsion polymer; Dow 620 from the Dow Chemical Company of Midland, Michigan. A copolymer of this invention (LEC 10) was added to a sample of the latex and the viscosity was increased without breakdown of the latex emulsion.

|  | Latex Viscosity, 20 rpm |
|---|---|
| w/o LEC 10 | 200 |
| 1.5% added of LEC 10 | 19,000 |

The resulting thickened emulsion is typical of glues, adhesives, coatings, paints and other sizing applications where latex based systems are known to have utility.

The polymers of this invention are also useful in processes for separating or destabizing oil in water emulsions. Emulsions of this type are commonly encountered in such diverse industries as oil production, hydrocarbon refining, natural gas production, synthetic rubber manufacture, food processing, paint and coating manufacturing operations and the like.

In all of the above examples, as well as in many others, an oily or non-aqueous material, as an example crude oil, is emulsified or suspended in an aqueous or non-oily material in which it is normally immiscible. Such non-oily materials include aqueous solutions of glycols, polar solvents, inorganic and organic salts, and dispersed or suspended solids.

The introduction of the copolymers of this invention, for example, is into a crude oil-in-water emulsion as said emulsion is admitted into a vessel suitably equipped for the removal of the separated oil and water phases. The method of introduction of the copolymers should be accomplished in such a manner as to permit the intimate commingling of all of the fluids.

Normally, the process of separating a crude oil-in-water emulsion can be accomplished without the addition of heat to the vessel. However in some systems, additional heat can be advantageous. It has been found that the application of additional heat is not required with the use of the copolymers of this invention.

BREAKING OIL-IN-WATER EMULSIONS

Copolymers of this invention selected from Table 3 were investigated for their effectiveness as reagents for breaking oil-in-water emulsions.

An oil-in-water crude oil emulsion was treated as follows:

A series of five bottles was filled with 100 ml of crude oil-in-water emulsion containing 500 p.p.m. oil. Each of the bottles was dosed with the copolymers selected from Table 3 in the following concentrations: 2.5, 5, 7.5, 10, 20 p.p.m. One bottle reserved as a control without the addition of the copolymer. Bottles were then shaken for 5 minutes at the rate of 150 shakes per minute. After agitation the bottles were allowed to stand for five minutes and the water analyzed for residual crude oil. The results are summarized in Table 3.

TABLE 3

| LEC Copolymer | RESIDUAL CRUDE OIL P.P.M. | | | | | |
|---|---|---|---|---|---|---|
| | 0.0 | 2.5 | 5.0 | 7.5 | 10.0 | 20.0 |
| 5 | 382 | 356 | 318 | 283 | 200 | 185 |
| 7 | 391 | 387 | 362 | 301 | 236 | 123 |
| 8 | 376 | 327 | 180 | 180 | 123 | 97 |
| 9 | 379 | 365 | 312 | 312 | 147 | 102 |
| 10 | 401 | 391 | 373 | 340 | 131 | 116 |
| 11 | 384 | 372 | 342 | 201 | 97 | 89 |

In all cases employing the copolymers of this invention as summarized in Table 3 there was a significant reduction in the amounts of crude oil remaining emulsified or suspended at the conclusion of the test. Therefore the copolymers of this invention have demonstrated ability to accelerate and enhance the effectiveness of breaking crude oil in water emulsions.

Water Clarification

In this example the copolymers of this invention were tested for their effectiveness as reagents to assist or enhance the process of water clarification of oil-in-water emulsion where dispersed gas flotation processes are employed. A typical example of equipment used for dispersed gas flotation is that produced by Envirotec Corporation, WEMCO Division and known as WEMPCO depurator. These tests were carried out as follows:

A crude oil-in-water emulsion containing 200 ppm crude oil was introduced into a WEMCO Laboratory Flotation Machine along with copolymers of this invention selected from Table 4. The following concentrations of copolymers were tested, 2.5, 5.0, 10, and 20 ppm as related to total emulsion.

The emulsion plus the copolymers of this invention were run in the WEMCO Flotation Machine for 4 minutes. After 4 minutes a sample was removed from the flotation cell and analyzed for residual crude oil. A similar test was run using no copolymer addition as a control. The results are summarized in Table 4.

TABLE 4

| LEC Copolymer | RESIDUAL CRUDE OIL P.P.M. | | | | |
|---|---|---|---|---|---|
| | 0.0 | 2.5 | 5.0 | 10.0 | 20.0 |
| 5 | 156 | 148 | 122 | 97 | 92 |
| 7 | 162 | 152 | 140 | 88 | 76 |
| 8 | 147 | 156 | 116 | 81 | 61 |
| 9 | 153 | 149 | 137 | 101 | 83 |
| 10 | 181 | 163 | 143 | 93 | 74 |
| 11 | 164 | 152 | 111 | 87 | 59 |

This example demonstrates that the copolymers of this invention do function as efficient oil-in-water clarification reagents.

FLOCCULANT EFFICIENCY

A 2% kaolin slurry (Huber Kaolex D 6) was used as the test medium. Kaolin is recognized as a standard substrate for flocculent testing but the example could also have used coal tailing, or metal tailings. The slurry was placed into a graduated cylinder and the time taken for the settlement front to cover a standard distance midway down the cylinder was measured.

The polymer LEC 20 was prepared as a 0.2% solution. The solution was added at 200, 100, 50 and 25 ppm to the slurry (or a dry/dry basis).

The following results were obtained:

| Additional Level ppm | Settlement Rate m/hr |
|---|---|
| — | 0.9 |
| 25 | 5.9 |
| 50 | 9.0 |
| 100 | 18.0 |
| 200 | 33.0 |

The polymer was demonstrated to be an effective flocculant.

THICKENING EFFICIENCY

Air Product EVA latex Airflex 526 B.P. is used in a number of applications such as ceramic tile and hydraulic cements. In certain applications, the products need to be thickened without an increase in pH.

The latex was thickened using a 2.5% W/W addition of example LEC 21 and a 2.5% W/W addition of a blend of 1:1 IGEPAL CO 660/CO 520. The product reached full viscosity in 10 minutes without any sign of flocculation or coagulation.

| | Viscosity cps | pH |
|---|---|---|
| 526 B.P. | 2200 | 4.6 |
| 2.5% W/W LEC 21 | 24000 | 4.6 |

ASPHALT EMULSION THICKENING FOR HIGHWAY MAINTENANCE

An asphalt emulsion was thickened using LEC 21. 240 g of the asphalt emulsion (viscosity 700 cps) was placed in a steel beaker with a mechanical stirrer. Into the emulsion, 8 g of a blend of 15:1 LEC 21 and IGEPAL CO. 520 was added. The emulsion was stirred for 10 minutes and the viscosity measured as 4050 cps. The rheology of the mix was suitable for highway maintenance and similar application.

The above examples describe some of the copolymers of the instant invention and some of the applications of these copolymers as a means of further describing this invention. These examples are not to be considered as limiting this invention as the invention is limited in scope only by the following claims.

I claim:

1. A water-in-oil emulsion comprising:
   (a) an oleophilic continuous phase; and
   (b) an aqueous dispersed phase; said dispersed phase containing a water soluble copolymer obtained by polymerizing in said water-in-oil emulsion a monomer system comprising:
      (1) an addition copolymerizable surfactant monomer which has adequate water solubility to remain in solution during solution polymerization yet which is polar enough that said surfactant monomer is essentially not extracted into said oleophilic phase of said water-in-oil emulsion; and (2) at least one neutral or neutralized water soluble vinyl monomer.

2. The water-in-oil emulsion of claim 1 where said addition copolymerizable surfactant monomer comprises about 0.1 to about 40 percent of said copolymer, based on the total weight of said copolymer.

3. The water-in-oil emulsion of claim 1 wherein said addition copolymerizable surfactant monomer is a substituted surfactant of the formula:

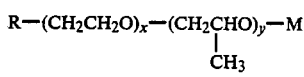

in which M is a monoethylenically unsaturated residue selected from:

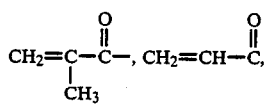

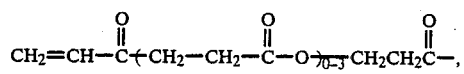

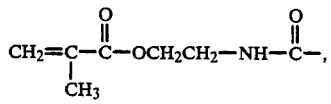

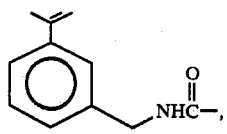

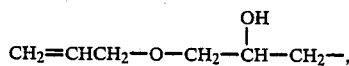

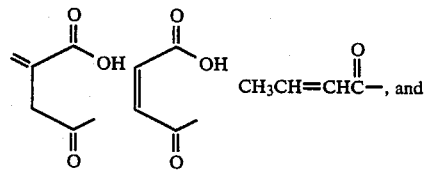

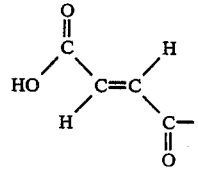

where x is an integer of from 1 to 150 and y is an integer of from 0 to 40 when R is alkoxy, alkylphenoxy, dialkylphenoxy or alkylcarbonyloxy wherein the alkyl groups have from 5 to 30 carbon atoms, or a sorbitan ester of the formula

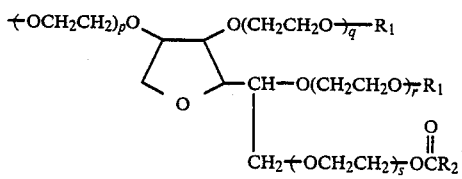

where each of p, q, r and s is an integer and the sum of said integers is from 0 to 40, and $R_1$ is H or $-COR_2$, and $R_2$ is alkyl, alkylphenyl, or dialkylphenyl wherein the alkyl groups have from 5 to 30 carbon atoms; or where x and y are from 0 to 40 when when R is $-NH(CH_2)_3O-R_3$, or

where $R_3$ is H or $R_4$, and $R_4$ is alkyl, alkylphenyl, or dialkylphenyl wherein the alkyl groups have from 5 to 30 carbon atoms.

4. The water-in-oil emulsion of claim 1 where said water soluble vinyl monomer is at least one of the group consisting of:

(a) nonionic monomers selected from acrylamide, methacrylamide, acrylonitrile, NN dimethyl acrylamide, methyl acrylate, N-vinyl acetamide, and N-vinyl-N-methyl acetamide;

(b) anionic monomers selected from 2-acrylamido-2-methyl propane sulfonic acid, styrene sulfonic acid, acrylic, methacrylic, itaconic, fumaric and crotonic acids and salts thereof and $C_1-C_{10}$ mono esters of itaconic, fumaric and maleic acids; and (c) cationic monomers selected from dimethyl amino ethyl acrylate, dimethyl amino ethyl methacrylate, dimethyl amino ethyl acrylate methyl chloride, dimethyl aminoethyl acrylate dimethyl sulfate, dimethyl aminoethyl acrylate acetate, dimethyl aminoethyl methacrylate methyl chloride, dimethyl aminoethyl methacrylate dimethyl sulfate, dimethyl aminoethyl methacrylate acetate, methacrylamino-propyl trimethyl ammonium chloride and other Mannich type monomer products.

5. The water-in-oil emulsion of claim 1 further comprising a polyethylenically unsaturated crosslinking monomer present in an amount ranging from about 0 to about 1% by weight, based on the total weight of monomers.

6. The water-in-oil emulsion of claim 1 where said addition copolymerizable surfactant monomer is selected from the group consisting of:

(1) heptadecyl poly(oxyethylene)$_{19}$ ethyl methylene succinate,
(2) dinonyl phenoxy poly(oxyethylene)$_8$ ethyl methylene succinate,
(3) sorbitan monstearate poly(oxyethylene)$_{19}$ ethyl methylene succinate,
(4) hexadecyloxy poly(oxyethylene)$_3$ ethyl methylene succinate, and
(5) dinonylphenoxy poly(oxyethylene)$_{39}$ ethyl methylene succinate.

7. The water-in-oil emulsion of claim 1 where said addition copolymerizable surfactant monomer is selected from the group consisting of:

(1) heptadecyl poly(oxyethylene)$_{19}$ maleate,
(2) dinonyl phenoxy poly(oxyethylene)$_8$ maleate,
(3) sorbitan monstearate poly(oxyethylene)$_{19}$ maleate,
(4) hexadecyloxy poly(oxyethylene)$_3$ maleate, and
(5) dinonylphenoxy poly(oxyethylene)$_{39}$ maleate.

8. A process for thickening a composition comprising adding to said composition a water-in-oil emulsion comprising:

(a) an oleophilic continuous phase; and (b) an aqueous dispersed phase; said dispersed phase containing a water soluble copolymer obtained by polymerizing in said water-in-oil emulsion a monomer system comprising:
  (1) an addition copolymerizable surfactant monomer which has adequate water solubility to remain in solution during solution polymerization yet which is polar enough that said surfactant monomer is essentially not extracted into said oleophilic phase of said water-in-oil emulsion; and
  (2) at least one neutral or neutralized water soluble vinyl monomer.

9. The process of claim 8 where said surfactant monomer is a substituted surfactant of the formula:

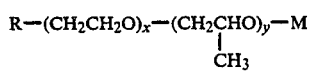

in which M is a monoethylenically unsaturated residue selected from:

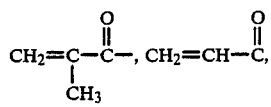

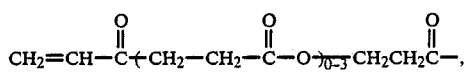

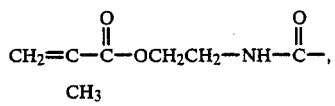

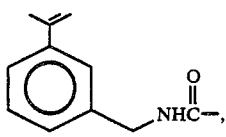

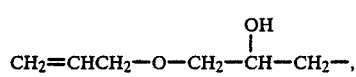

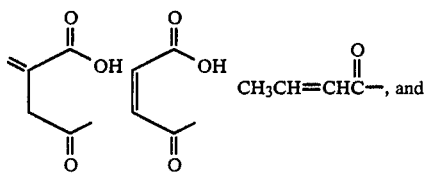

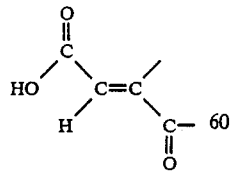

where x is an integer of from 1 to 150 and y is an integer of from 0 to 40 when R is alkoxy, alkylphenoxy, dialkylphenoxy or alkylcarbonyloxy wherein the alkyl groups have from 5 to 30 carbon atoms, or a sorbitan ester of the formula

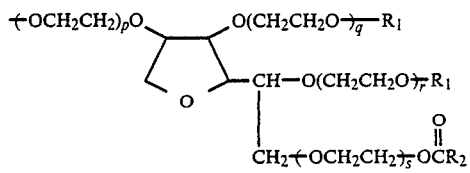

where each of p, q, r and s is an integer and the sum of said integers is from 0 to 40, and $R_1$ is H or $-COR_2$, and $R_2$ is alkyl, alkylphenyl, or dialkylphenyl wherein the alkyl groups have from 5 to 30 carbon atoms; or where x and y are from 0 to 40 when when R is $-NH(CH_2)_3O-R_3$, or

where $R_3$ is H or $R_4$, and $R_4$ is alkyl, alkylphenyl, or dialkylphenyl wherein the alkyl groups have from 5 to 30 carbon atoms.

10. The process of to claim 8 where said water soluble vinyl monomer is at least one of:
  (a) nonionic monomers selected from acrylamide, methacrylamide, acrylonitrile, NN dimethyl acrylamide, methyl acrylate, N-vinyl acetamide, and N-vinyl-N-methyl acetamide;
  (b) anionic monomers selected from 2-acrylamido-2-methyl propane sulfonic acid, styrene sulfonic acid, acrylic, methacrylic, itaconic, fumaric and crotonic acids and salts thereof and $C_1-C_{10}$ mono esters of itaconic, fumaric and maleic acids; and
  (c) cationic monomers selected from dimethyl amino ethyl acrylate, dimethyl amino ethyl methacrylate, dimethyl amino ethyl acrylate methyl chloride, dimethyl aminoethyl acrylate dimethyl sulfate, dimethyl aminoethyl acrylate acetate, dimethyl aminoethyl methacrylate methyl chloride, dimethyl aminoethyl methacrylate dimethyl sulfate, dimethyl aminoethyl methacrylate acetate, methacrylamino-propyl trimethyl ammonium chloride and other Mannich type monomer products.

11. The process of claim 8 where said addition copolymerizable surfactant monomer is selected from the group consisting of:
  (1) heptadecyl poly(oxyethylene)$_{19}$ ethyl methylene succinate,
  (2) dinonyl phenoxy poly(oxyethylene)$_8$ ethyl methylene succinate,
  (3) sorbitan monstearate poly(oxyethylene)$_{19}$ ethyl methylene succinate,
  (4) hexadecyloxy poly(oxyethylene)$_3$ ethyl methylene succinate, and
  (5) dinonylphenoxy poly(oxyethylene)$_{39}$ ethyl methylene succinate.

12. The process of claim 8 where said addition copolymerizable surfactant monomer is selected from the group consisting of:
  (1) heptadecyl poly(oxyethylene)$_{19}$ maleate,
  (2) dinonyl phenoxy poly(oxyethylene)$_8$ maleate,
  (3) sorbitan monstearate poly(oxyethylene)$_{19}$ maleate,
  (4) hexadecyloxy poly(oxyethylene)$_3$ maleate, and
  (5) dinonylphenoxy poly(oxyethylene)$_{39}$ maleate.

13. The process of claim 8 where said water-in-oil emulsion is substantially dewatered to form a copolymer dispersion in oil.

14. A process according to claim 8 where said composition is a print paste.

15. A process according to claim 8 where said composition is an oil well drilling fluid.

16. A process according to claim 8 where said composition is a wall joint compound.

17. A process according to claim 8 where said composition is a wallpaper prepaste.

18. A process according to claim 8 where said composition is an adhesive.

19. A process according to claim 8 where said composition is a cleaner.

20. A process according to claim 8 where said composition is a latex.

21. A process according to claim 8 where said composition is a water clarifier.

22. A process according to claim 8 where said composition is a water/glycol mixture.

23. A process according to claim 8 where said composition is a defoamer.

24. A process according to claim 8 where said composition is an asphalt emulsion.

* * * * *